United States Patent
Person

(10) Patent No.: US 6,968,823 B2
(45) Date of Patent: Nov. 29, 2005

(54) ROTARY INTERNAL COMBUSTION ENGINE

(75) Inventor: Matt Person, 7401 SW. Hunters Pl., Denton, NE (US) 68339

(73) Assignee: Matt Person, Denton, NE (US)

( * ) Notice: Subject to any disclaimer, the term of this patent is extended or adjusted under 35 U.S.C. 154(b) by 0 days.

(21) Appl. No.: 10/647,491

(22) Filed: Aug. 25, 2003

(65) Prior Publication Data

US 2005/0045143 A1 Mar. 3, 2005

(51) Int. Cl.⁷ .............. F02B 53/04; F01C 1/02; F01C 1/00
(52) U.S. Cl. .............. 123/237; 123/236; 418/61.3; 418/166; 418/255
(58) Field of Search .............. 123/230, 236, 123/241, 242, 237, 235; 418/255, 254, 253, 61.3, 166

(56) References Cited

U.S. PATENT DOCUMENTS

| | | | | |
|---|---|---|---|---|
| 1,066,506 A | * | 7/1913 | Krogel | 418/255 |
| 2,128,330 A | * | 8/1938 | Schlitz | 418/166 |
| 2,359,903 A | | 10/1944 | Fanning | 418/255 |
| 2,511,441 A | | 6/1950 | Casimir | 123/235 |
| 3,226,013 A | * | 12/1965 | Toyoda et al. | 418/61.3 |
| 4,209,001 A | * | 6/1980 | Miles | 123/242 |
| 4,414,938 A | * | 11/1983 | Umeda | 123/230 |
| 4,422,419 A | * | 12/1983 | Umeda | 123/236 |
| 6,010,322 A | * | 1/2000 | Lai | 418/255 |
| 2003/0035746 A1 | * | 2/2003 | Kim | 418/255 |

FOREIGN PATENT DOCUMENTS

| | | | | |
|---|---|---|---|---|
| DE | 3705079 A1 | | 10/1987 | 123/236 |
| DE | 3615102 A1 | * | 11/1987 | 123/230 |
| DE | 4229999 A1 | | 3/1994 | 123/237 |
| EP | 85427 A1 | | 8/1983 | 123/237 |
| JP | 55032943 A | * | 3/1980 | 123/230 |
| JP | 57146091 A | * | 9/1982 | 418/255 |
| JP | 57173528 A | * | 10/1982 | 123/230 |

* cited by examiner

Primary Examiner—Thai-Ba Trieu

(57) ABSTRACT

A rotary engine is provided that comprises a compression cylinder and combustion cylinder divided by a separation wall. Air or a fuel/air mixture is drawn into the compression cylinder, compressed, and then transferred to the combustion cylinder. The compressed air or air/fuel mixture is ignited in the combustion cylinder, creating an expansion of the combustion gases which drives the system. The compression and combustion cylinders have epicycloidal-shaped chambers that each house a single vane. The vanes pass through the crankshaft and adjust to remain in contact with the chamber walls as the crankshaft rotates. The compression ratio of the present invention can be maximized by adjusting the thicknesses of the compression and combustion cylinders as well as by offsetting the positions of the compression and combustion vanes with respect to one another.

15 Claims, 6 Drawing Sheets

# ROTARY INTERNAL COMBUSTION ENGINE

BACKGROUND OF THE INVENTION

The present invention relates to internal combustion engines and, more particularly, rotary engines for use in vehicles and the like.

Rotary internal combustion engines are well known within the art. The main advantage rotary engines offer over commonly used inline or v-shaped, reciprocating-piston, internal combustion engines is their compact size. As a result of their compact size, it is difficult to achieve a high compression ratio. In addition, because conventional rotary engines typically employ many intricate parts, rotary engines have been difficult and expensive to manufacture. Further, conventional rotary engines have been considerably less efficient than commonly used inline or v-shaped, reciprocating-piston, internal combustion engines. Because of these problems, the rotary engine has not been as commercially viable as other internal combustion engines.

It is therefore a principal object of this invention to provide a simplified rotary internal combustion engine that uses a minimum number of parts.

A further object of this invention is to provide a rotary internal combustion engine with increased operational efficiency.

These and other objects will be apparent to those skilled in the art.

BRIEF SUMMARY OF THE INVENTION

The present invention is directed towards a rotary internal combustion engine for use in vehicles and the like having an engine block that comprises a compression cylinder and combustion cylinder divided by a separation wall. Air or a fuel/air mixture is drawn into the compression cylinder, compressed, and then transferred to the combustion cylinder. The compressed air or air/fuel mixture is ignited in the combustion cylinder, creating an expansion of the combustion gases which drives the system.

The compression and combustion cylinders have epicycloidal-shaped chambers that each house a single vane disposed between a pair of half rotors. The vanes pass through the crankshaft and adjust to remain in contact with the chamber walls as the crankshaft rotates.

The compression ratio of the present invention can be changed by adjusting the depth of the compression and combustion cylinders as well as by offsetting the positions of the compression and combustion chambers with respect to one another.

DESCRIPTION OF THE PREFERRED EMBODIMENT

Figure 1:
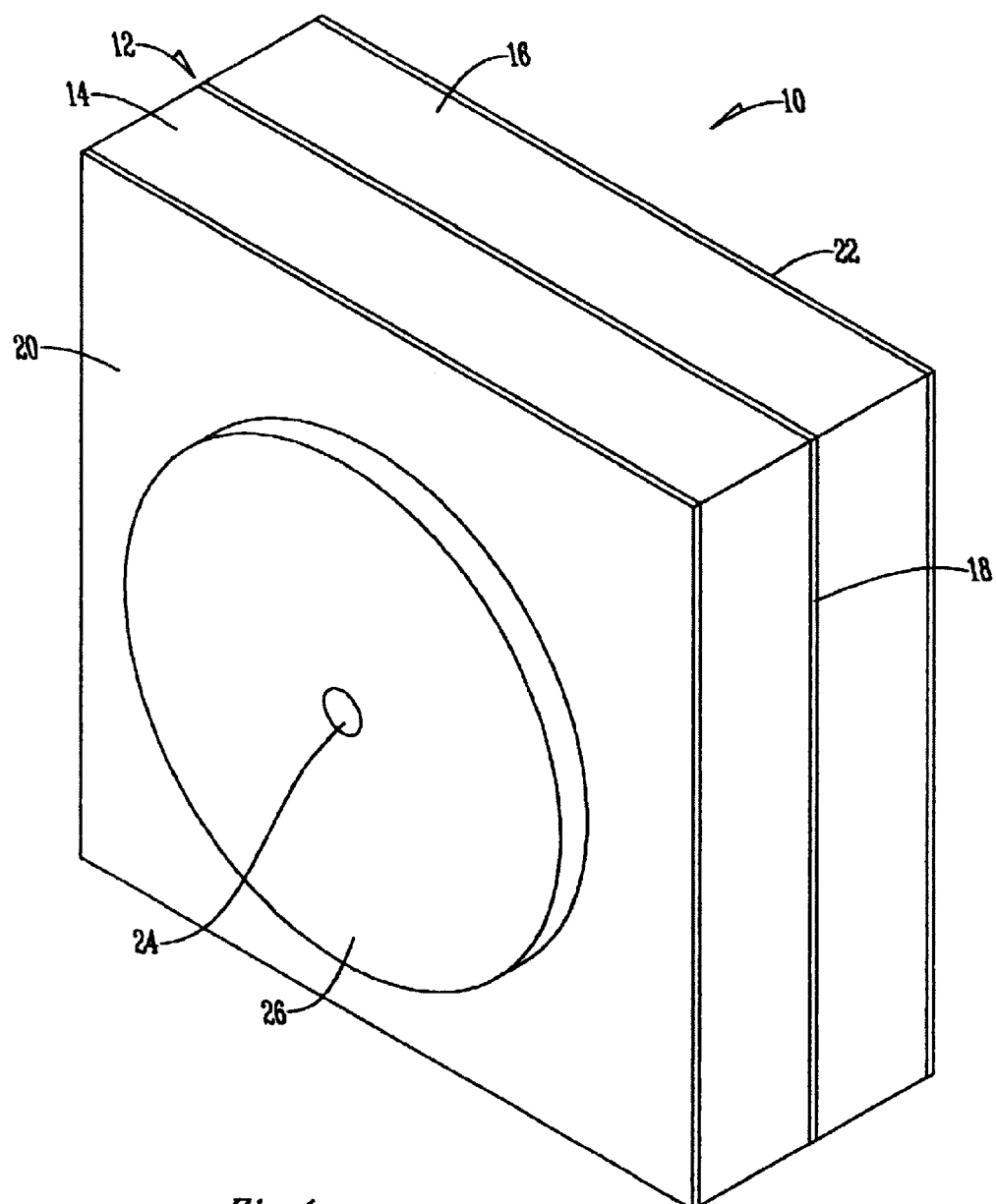
FIG. 1 is a perspective view of the rotary engine of the present invention.
Figure 2:
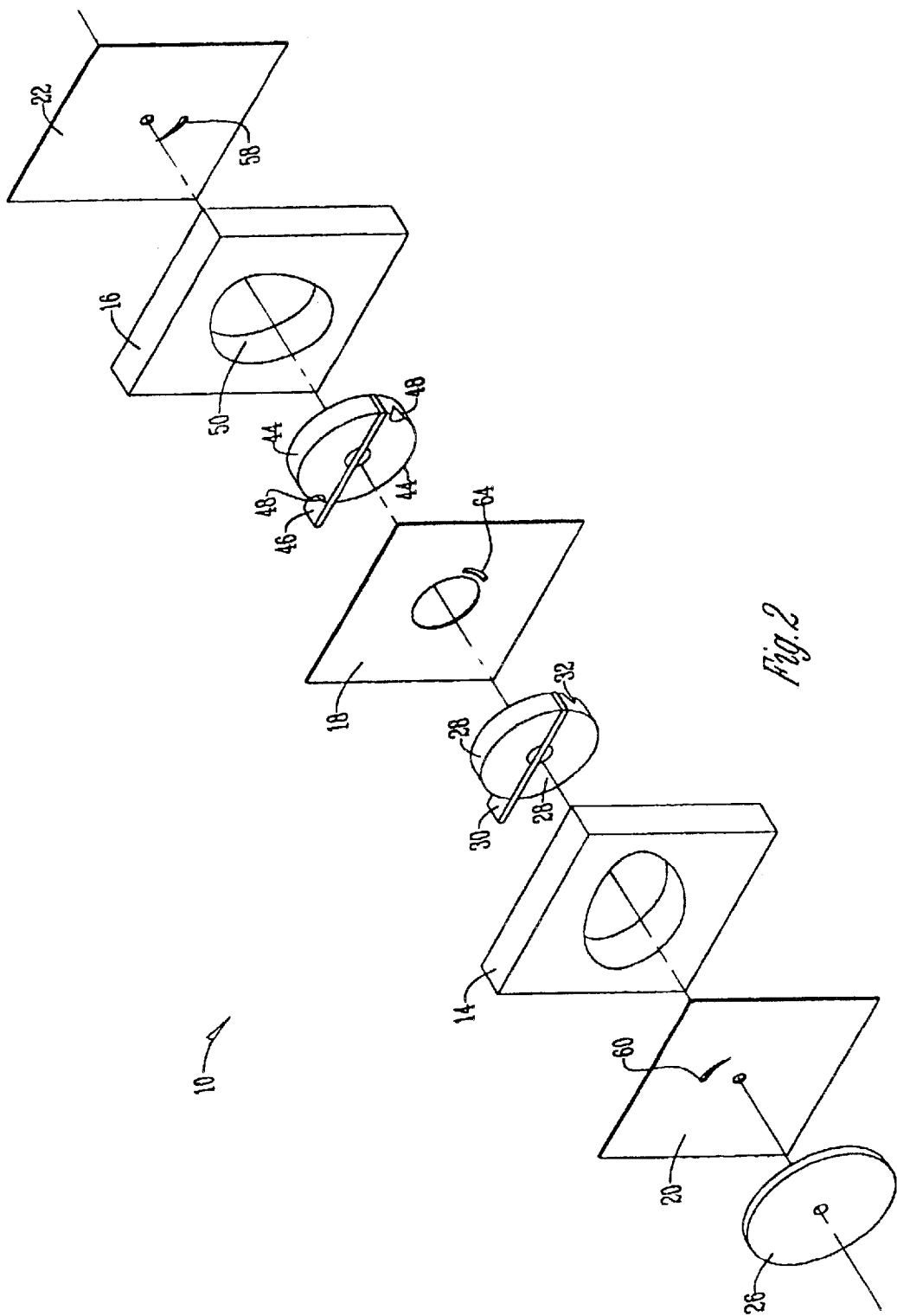
FIG. 2 is an exploded perspective view of the present invention.
Figure 3:
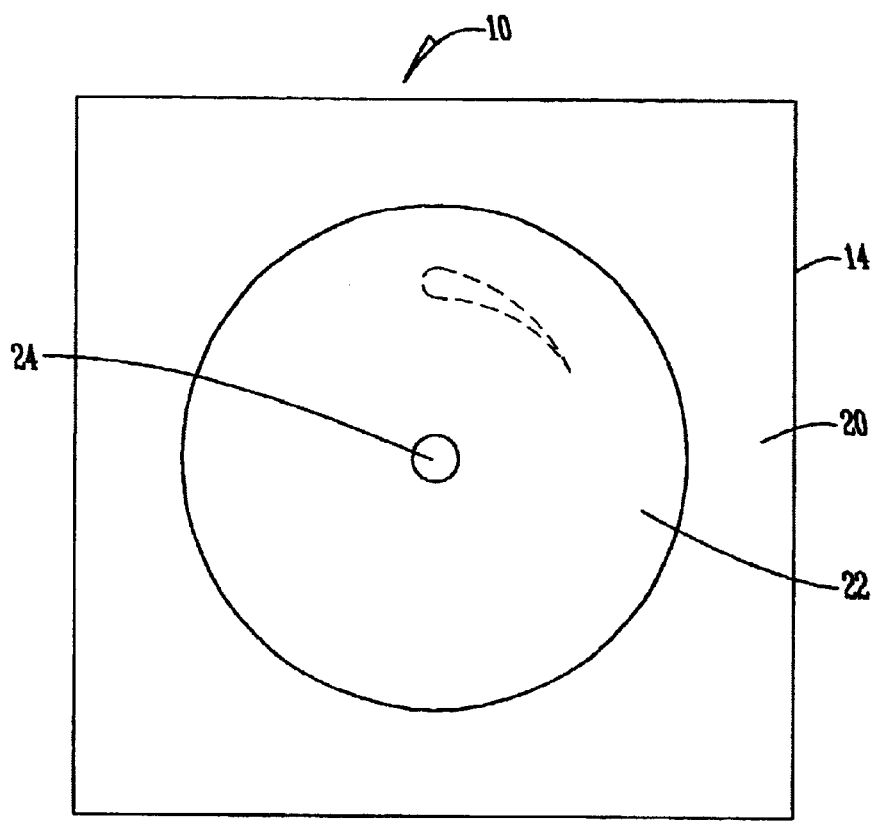
FIG. 3 is an end view of the rotary engine.
Figure 4:
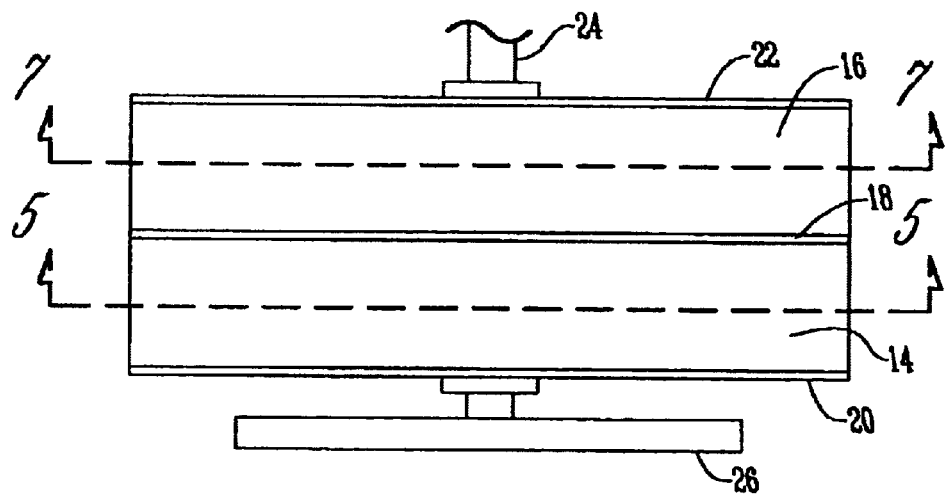
FIG. 4 is a top view of the rotary engine.

Referring to the drawings, the internal rotary combustion engine 10 has an engine block 12 comprising a compression cylinder 14 and a combustion cylinder 16 separated by a wall 18 with an inlet wall 20 at one end of the block 12 and an exhaust wall 22 at the opposite end of the block. Extending through the block 12 from the inlet wall 18 to the exhaust wall 22 is a crank shaft 24 that is rotably mounted thereto. The crankshaft 24 has a fly wheel 26 connected to one end of the shaft and a power source (not shown) connected to the opposite end.

The engine described herein is for a single cylinder internal combustion engine fueled by gasoline, diesel fuel or the like and can either be ignited by spark or compression. An engine built on the same principles can be made with additional engine blocks 12 operably connected to the crankshaft 24 in series.

Figure 5:
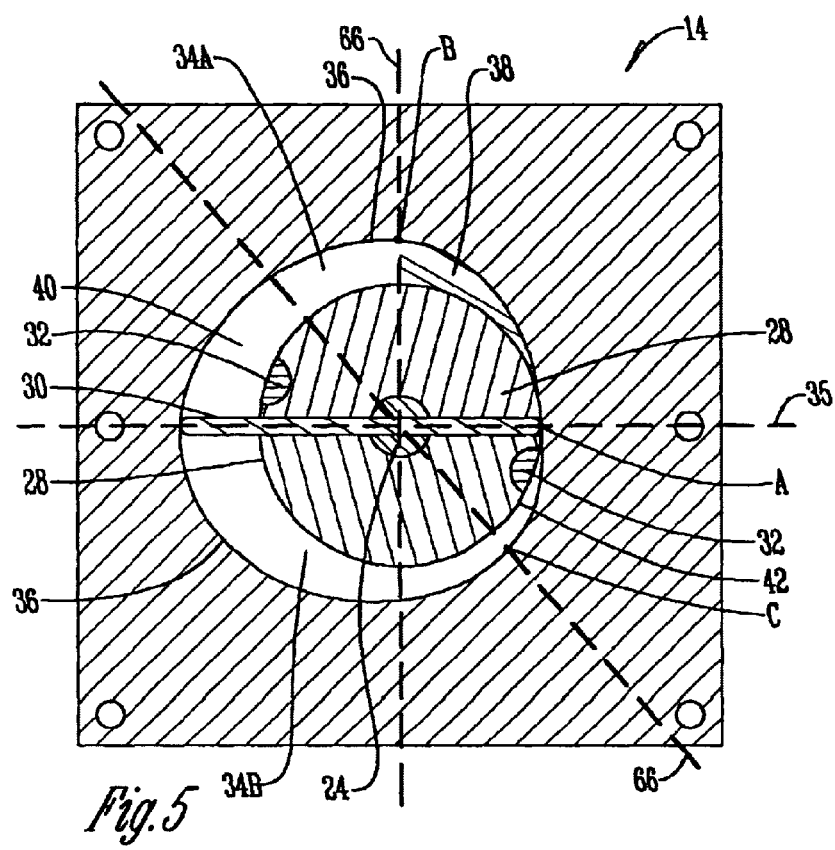
FIG. 5 is an end view of the compression cylinder of the present invention with the compression vane located at the 0° position.
Figure 6:
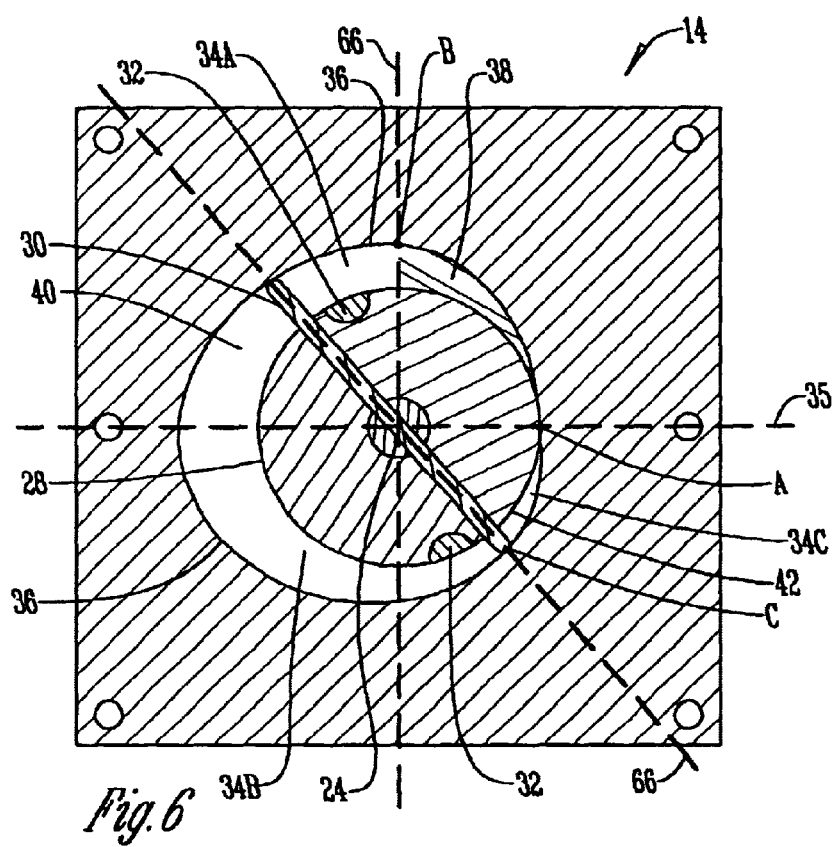
FIG. 6 is an end view of the compression cylinder of the present invention with the compression vane rotated away from the 0° position.
Figure 7:
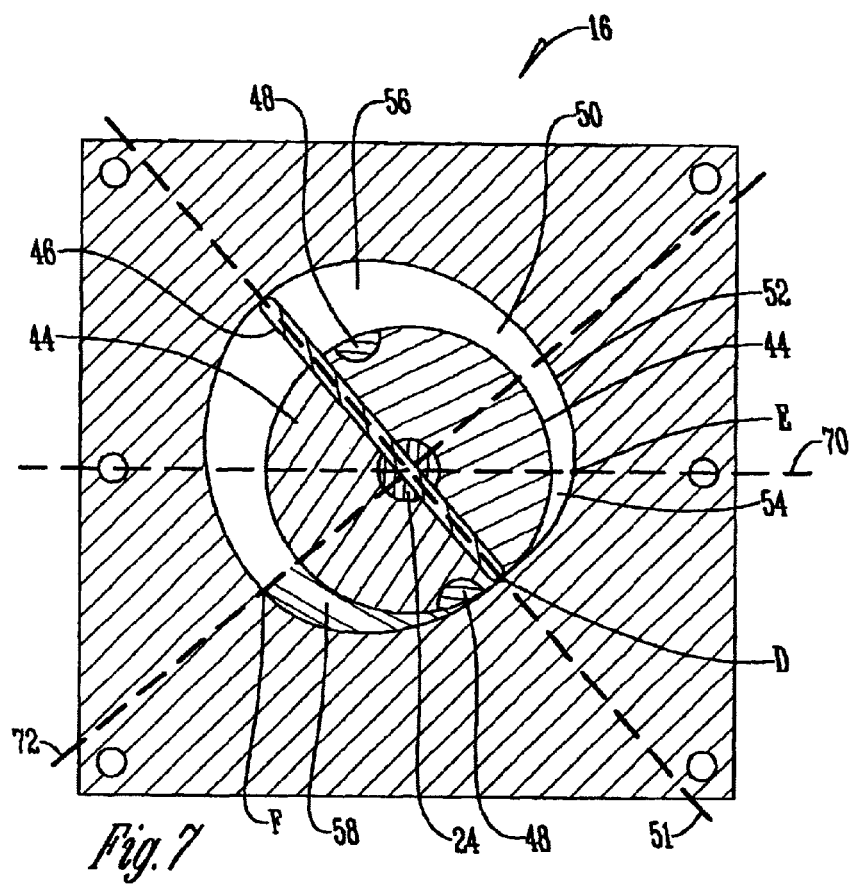
FIG. 7 is an end view of the combustion cylinder with the combustion vane at the 0° position.
Figure 8:
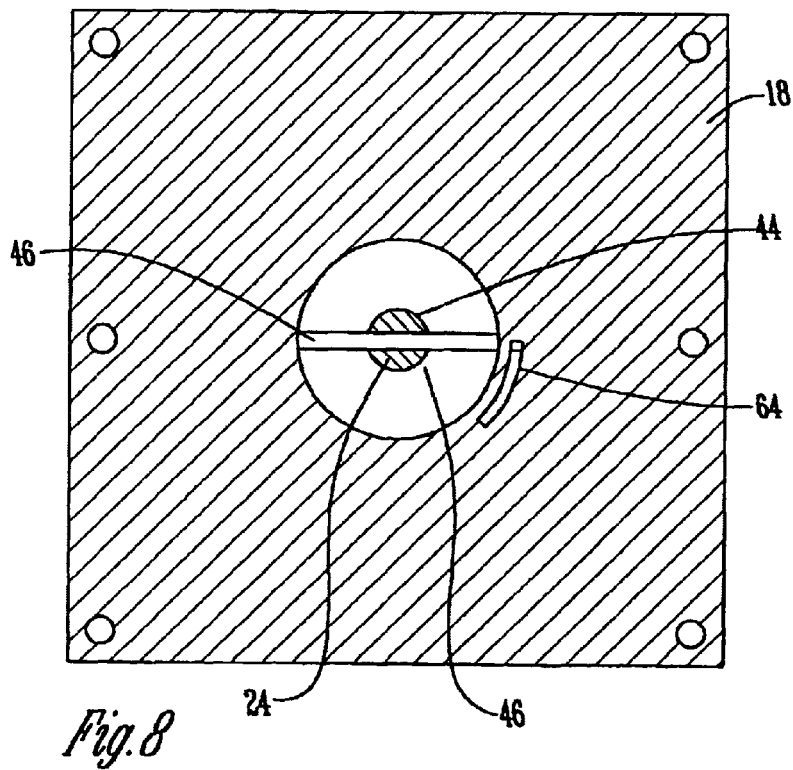
FIG. 8 is an end view of the separation wall with the combustion chamber components behind.
Figure 9:
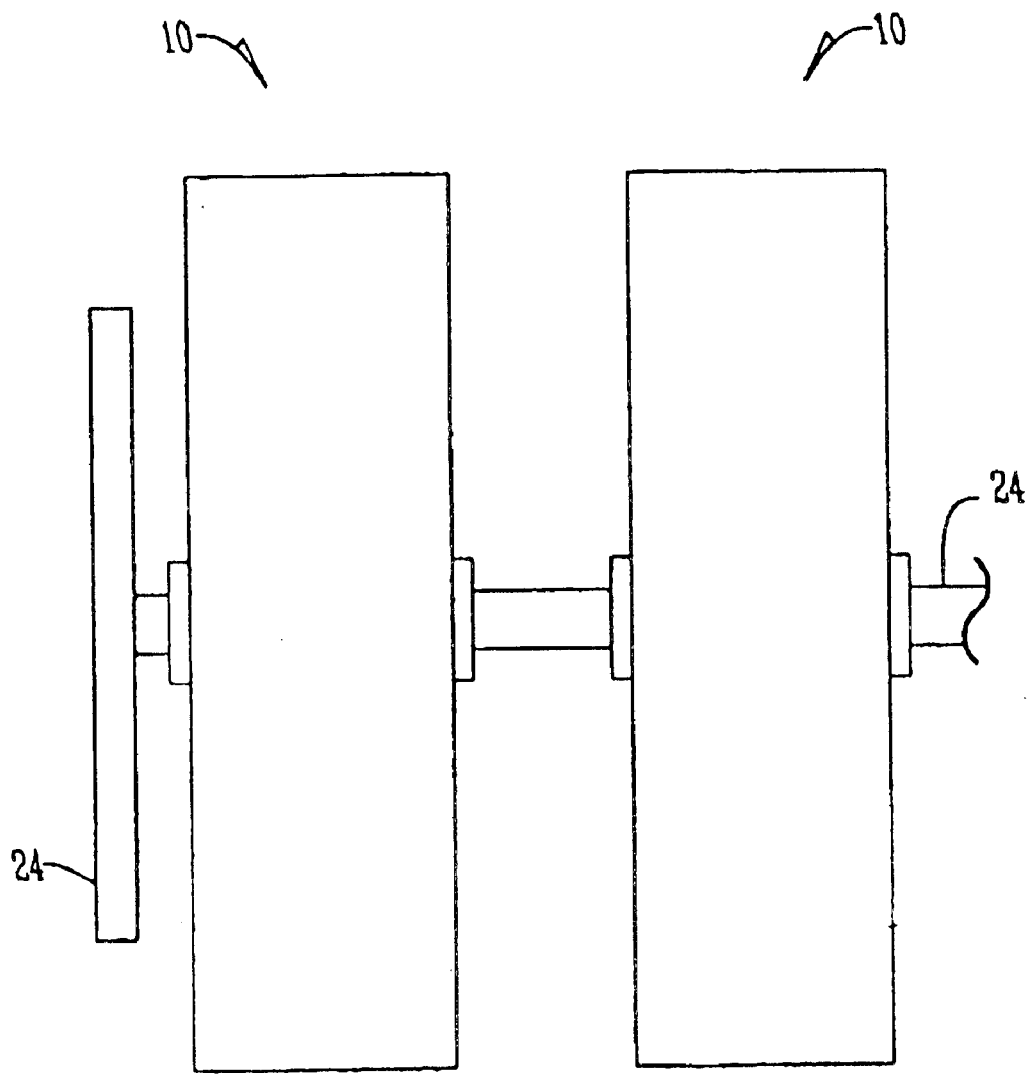
FIG. 9 is a top plan view of the rotary engine.

The compression cylinder 14 has a pair of half circular compression rotors 28 attached to the crankshaft 24 with a compression vane 30 that is slidably secured and extends through the crankshaft 24 between the compression rotors 28. The compression rotors 28 have semi-conical ports 32 located on the sides of the compression rotors 28 in communication with separating wall 18 and tapered toward inlet wall 20. The rotors 28 and compression vane 30 are contained within a compression chamber 34 which preferably has an epicycloidal shape. The chamber 34 has a first compression axis 35 that extends from point A or the 0° position where the rotors 28 contact the chamber wall 36 through the rotational axis of the crankshaft 24 to the opposite side of the chamber 34. At the first axis 35, the diameter of the vane 30 is such that the ends of the vane engage the chamber wall 36 at opposite sides, separating the chamber 34 into two sub chambers 34A and 34B as shown in FIG. 5. As the crankshaft 24 rotates, the vane 30 sweeps the chamber wall 36 creating three sub chambers 34A, 34B, and 34C as shown in FIG. 6.

The compression chamber 34 has three sections: an intake section 38, a compression section 40, and a transfer section 42. The intake section 38 extends from point A on the chamber wall 36 to point B, or the 90° position on the chamber wall. The compression section 40 extends from point B to point C, or the 315° position on the chamber wall 36. The transfer section 42 extends from point C to point A on the chamber wall 36.

The combustion cylinder 16 also has a pair of half circular combustion rotors 44 attached to the crankshaft 24 with a combustion vane 46 that is slidably secured and extends through the crankshaft 24 between the combustion rotors 44. The combustion rotors 44 also have semi-conical ports 48 located on the sides of the combustion rotors 44 communicating with separating wall 18 and tapered toward the exhaust wall 22. The combustion rotors 44 and combustion vane 46 are contained within a combustion chamber 50 which preferably has an epicycloidal shape. The combustion chamber 50 has a first combustion axis 51 that extends from point D, or the 0° position, where rotors 44 contact chamber wall 52 through the rotational axis of the crankshaft 24 to the opposite side of the chamber 50. At the first combustion axis 51, the diameter of vane 46 is such that the ends of the vane engage the chamber wall 52 at opposite sides.

The combustion chamber 50 has three sections: a transfer section 54, an expansion section 56, and an exhaust section 58. The transfer section 54 extends from point D to point E, or the 45° position on chamber wall 52. The expansion section 56 extends from point E to point F or the 270° position on chamber wall 52. The exhaust section 58 extends from point F to point D.

Compression cylinder 14 is secured to the intake wall 20 at its outer end. Intake wall 20 includes an intake slot 60, which is aligned with the intake section 38 of the compression cylinder 14. Combustion cylinder 16 is secured to the exhaust wall 22 at its outer end. Exhaust wall 22 includes an exhaust slot 62, which is located in communication with the exhaust section 58 of combustion cylinder 16. Compression cylinder 14 and combustion cylinder 16 are in general alignment and are separated by wall 18. Separating wall 18 includes a transfer slot 64, which places transfer section 42 of the compression cylinder 14 in communication with transfer section 54 of the combustion chamber 16.

In operation, as crankshaft 24 rotates, the compression cylinder 14 receives air, or an air fuel mixture, from the intake slot 60 of the inlet wall 20 into the intake section 38 of the compression chamber 34 as the compression vane 30 rotates from the first compression axis 35 at point A to a second compression axis 66 that extends from point B through the crankshaft 24 at the opposite side of the chamber wall 36. Specifically, as compression vane 30 sweeps from first compression axis 35 to second compression axis 66, semi-circular port 32 in compression rotor 28 aligns with intake slot 60 in intake wall 20. The air, or air and fuel mixture, is then compressed in the compression section 40 of the compression chamber 34 as the vane 30 rotates from the second compression axis 66 to the third compression axis 68 that extends from point C through the crankshaft 24 to the opposite side of the chamber wall 36.

As vane 30 continues to rotate within compression chamber 34, from the third compression axis 68 to the first compression axis 35, the compressed air is transferred from the transfer section 42 of the compression chamber 34 through the transfer slot 64 to the transfer section 54 of the combustion chamber 50. Specifically, as vane 30 rotates from axis 68 to axis 35, semi-conical port 32 in compression rotor 28 aligns with transfer slot 64 in separation wall 18. At the same time, the semi-conical port 48 in combustion aligns with the transfer slot 64 to allow the compressed air, or air and fuel mixture, to pass from the transfer slot 64 into the combustion cylinder 16.

While vane 30 is rotating within compression chamber 34 from the third compression axis 68 to the first compression axis 35, combustion vane 46 rotates from the first combustion axis 51 to a second combustion axis 70 that extends from point E through the crankshaft to the opposite side of the combustion chamber wall 52. Vane 30 and vane 46, which are both connected to the crankshaft, rotate at the same speed and in parallel alignment. At this point, fuel is injected and/or the mixture is ignited by any conventional means. With a fuel-injected system, fuel is injected into the compressed air in the expansion section 56 of the combustion chamber 50 when the combustion vane 46 reaches the second combustion axis 70. With a carbureted system, the compressed air and fuel mixture is spark-ignited when the combustion vane 46 reaches the second combustion axis 70.

The combustion of the air and fuel mixture causes an expansion of the combustion gases, forcing the combustion vane 46 to move from the second axis 70 to a third combustion axis 72 that extends from point F through the crankshaft 24 to the opposite side of chamber wall 52. This expansion provides the power that causes combustion vane 46 to rotate within chamber 50 and ultimately drives the rotation of crankshaft 24. As combustion vane 46 rotates from axis 72 to axis 51, the combustion gases exit the combustion cylinder 16 through exhaust slot 62. Specifically, as the combustion vane 46 sweeps from axis 72 to axis 51, the semi-conical port 48 in combustion rotor 44 aligns with the exhaust slot 62 in exhaust wall 22. The combustion gases move from the combustion cylinder 16 through semi-conical port 48 and out the exhaust slot 62. By the time the combustion vane 46 returns to axis 51, the combustion gases have been exhausted and the entire cycle repeats.

The efficiency of the rotary engine 10 can be improved by increasing the compression ratio. A higher compression ratio provides for more thorough combustion of the air or air/fuel mixture, which creates more power to drive the crankshaft 24. The compression ratio of the rotary engine 10 can be maximized by varying the ratio of the depth of the compression cylinder 14 from the inlet wall 20 to the separation wall 18 as compared to the depth of the combustion cylinder 16 from the exhaust wall 22 to the separation wall 18.

The compression ratio is also affected by the position of the combustion chamber 50 in relation to compression chamber 34 about the rotational axis of the crankshaft 24. Specifically, the compression ratio is affected by the position of point D, or the 0° position on the combustion chamber 50 in relation to point A, or the 0° position on the combustion chamber 34 when the two chambers are generally aligned along the rotational axis of the crankshaft. Preferred is that point D be offset from point A between 0° and 45°. As an example, when the depth of the compression cylinder 14 and the combustion cylinder 16 are the same, the point D is offset from point A by 45°, the compression ratio is approximately 36:1. The compression ratio can be increased by either increasing the depth of the compression cylinder as compared to the depth of the combustion chamber or by reducing the degree of offset between the two chambers. As can be seen, the above disclosure meets the stated objectives.

What is claimed is:

1. A rotary internal combustion engine comprising:
    a compression chamber having a first 0° position adapted to receive fuel and compress the fuel;
    an ignition chamber having a second 0° position adapted to receive compressed fuel from the compression chamber and combust the compressed fuel wherein the second 0° position is offset in relation to the first 0° position; and
    a separation wall between the compression chamber and ignition chamber adapted to allow passage of compressed fuel from the compression chamber to the ignition chamber.

2. The apparatus of claim 1, further comprising a first rotor rotatably received within the compression chamber and a second rotor rotatably received within the ignition chamber.

3. The apparatus of claim 2, wherein each rotor has a vane slidably mounted in a radially extended slot so that rotation of the rotors causes outer ends of the vane to engage the chambers to vary the space on opposite sides of the vane when the rotors are rotating.

4. The apparatus of claim 1, further comprising a transfer slot in the separation wall adapted to permit compressed fuel to move from the compression chamber into the ignition chamber.

5. The apparatus of claim 1, wherein the compression chamber has an epicycloidal-shaped wall.

6. The apparatus of claim 1, wherein the combustion chamber has an epicyclodial-shaped wall.

7. The apparatus of claim 1, wherein the second 0° position is offset in relation to the first 0° position between 0 and 45 degrees.

8. The apparatus of claim 1, wherein a plurality of the rotary internal combustion engines are used in series along the same axis of rotation.

9. A rotary internal combustion engine, comprising:
- a compression chamber adapted to receive fuel and compress the fuel;
- an ignition chamber adapted to receive compressed fuel from the compression chamber and combust the compressed fuel;
- a separation wall between the compression chamber and ignition chamber adapted to allow passage of compressed fuel from the compression chamber to the ignition chamber;
- the compression chamber having an epicyclodial-shaped chamber wall; and
- the ignition chamber having an epicyclodial-shaped chamber wall.

10. The apparatus of claim 9, further comprising a first rotor rotatably received within the compression chamber and a second rotor rotatably received within the ignition chamber.

11. The apparatus of claim 10, wherein each rotor has a vane slidably mounted in a radially extended slot so that rotation of the rotors causes outer ends of the vane to engage the chambers to vary the space on opposite sides of the vane when the rotors are rotating.

12. The apparatus of claim 9, further comprising a transfer slot in the separation wall adapted to permit compressed fuel to move from the compression chamber into the ignition chamber.

13. The apparatus of claim 9, wherein the compression chamber has an epicycloidal-shaped wall comprising:
- a compression chamber having a first 0° position adapted to receive fuel and compress the fuel;
- an ignition chamber having a second 0° position adapted to receive compressed fuel from the compression chamber and combust the compressed fuel wherein the second 0° position is offset in relation to the first 0° position; and
- a separation wall between the compression chamber and ignition chamber adapted to allow passage of compressed fuel from the compression chamber to the ignition chamber.

14. The apparatus of claim 9, wherein the second 0° position is offset in relation to the first 0° position between 0 and 45 degrees.

15. The apparatus of claim 9, wherein a plurality of the rotary internal combustion engines are used in series along the same axis of rotation.

* * * * *